July 30, 1968  C. J. KOESTER  3,395,368
FRUSTO-CONICAL LASER CONFIGURATION
Original Filed July 27, 1962
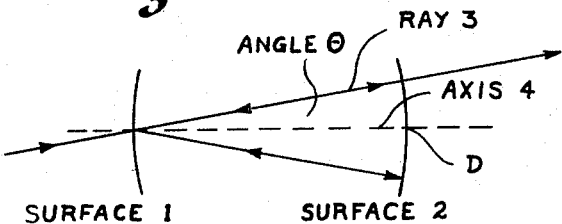
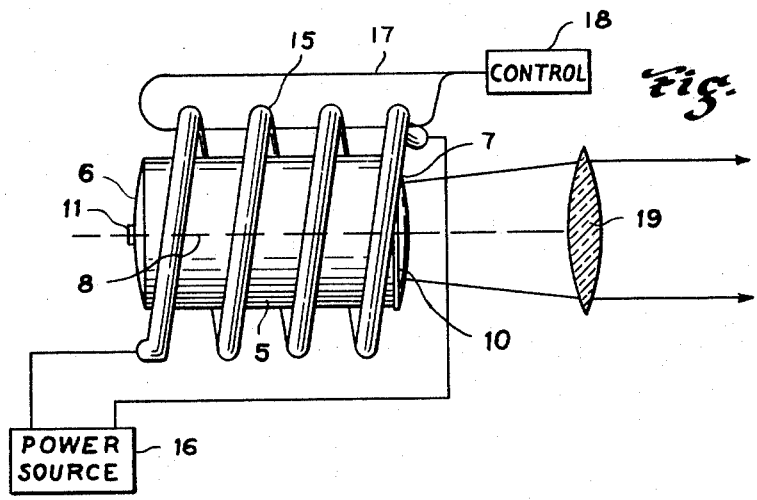
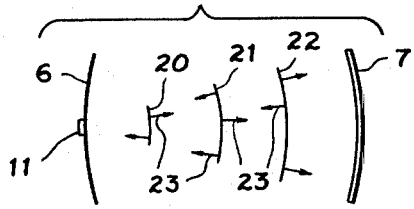
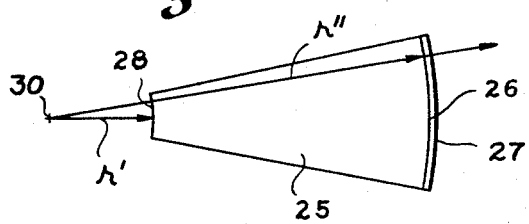
INVENTOR.
CHARLES J. KOESTER
BY
ATTORNEY

3,395,368
FRUSTO-CONICAL LASER CONFIGURATION

Charles J. Koester, South Woodstock, Conn., assignor, by mesne assignments, to Warner-Lambert Pharmaceutical Company, Morris Plains, N.J., a corporation of Delaware
Original application July 27, 1962, Ser. No. 212,818. Divided and this application Dec. 21, 1966, Ser. No. 603,606
5 Claims. (Cl. 331—94.5)

ABSTRACT OF THE DISCLOSURE

A resonant laser cavity having a frusto-conical shape with the larger end having a convex surface and the smaller end having a concave surface with a curvature concentric with the convex surface.

---

This application is a division of co-pending application Ser. No. 212,818, filed July 27, 1962.

This invention pertains to an improved laser configuration and has reference to the general arrangement in which two spherical reflectors of equal curvature are separated by their common radius of curvature, as discussed in Bell System Technical Journal of March 1961, beginning on page 489.

If a standard Fabry-Perot interforometer is adjusted to satisfy the interference equation $n\lambda = 2t \cos \theta$, at normal incidence $\theta = 0$, for a particular wavelength $\lambda_0$, then for an angle $\theta$ slightly different from 0, the interference condition is satisfied for another wavelength $\lambda$. In a laser this would lead to a stimulated emission whose wavelength depended on the angle $\theta$.

With the spherical Fabry-Perot interferometer, however, the resonant wavelength would be independent of angle which therefore makes possible a narrower output line for the laser.

Referring to the drawings:

FIG. 1 is a diagram showing the fundamental arrangement of the spherical Fabry-Perot interferometer which is applied to a laser.

FIG. 2 is a diagrammatic view partially in cross-section of a solid cylindrical laser formed with convex end surfaces and embodying this invention.

FIG. 3 is a diagram showing the waves formed at several radial distances from the center of curvature of the spherical wave.

FIG. 4 is a diagrammatic view of a conical-shaped laser arrangement also embodying this invention.

Special reference may first be had to FIG. 1, in which spaced surfaces 1 and 2 form arcs of circles. The center of curvature of surface 2 lies at the vertex C on surface 1 and the center of curvature of surface 1 lies at the vertex D on surface 2. All rays passing through the point C and striking surface 2 are reflected directly back on themselves and execute the path indicated by lines with arrows thereon. The interference condition is represented by $n\lambda = 4t\mu$, where $n$ is an integer, $\lambda$ = wavelength and $t$ = separation of surfaces along the axis, which is equal to the radius of surface 2, and $\mu$ = index of refraction of the laser material.

It should be noted particularly that the interference equation is independent of the angle $\theta$ which the ray 3 makes with respect to the axis 4 of the system (shown in broken lines).

The spherical Fabry-Perot interferometer may have both surfaces 1 and 2 coated for high reflection over their whole areas. However, in accordance with this invention, the arrangement shown in FIG. 2 has a definite advantage because the number of modes which can be excited is reduced and thereby more of the available pumping energy is put into a few desired modes.

Referring specifically to FIG. 2:

A solid laser material such as a ruby is formed into a cylinder 5 and has its end surfaces 6 and 7 curved as are surfaces 1 and 2 in FIG. 1, with the center of curvature of each at the point where the axis 8 intersects the other.

The surface 7 is provided with a silver coating 10 or is otherwise made a high reflectance area.

As here shown, however, the surface 6 has only a small high reflectance area at 11 and the remainder of this surface is preferably roughened or absorbing as is the outer cylindrical wall of the cylinder 5.

With this arrangement the only wave which is reinforced by inter-reflections is essentially a portion of a spherical wave with its center at 11. Other waves are lost either through the sides or through the low-reflection area of surface 6.

For best mode selection the sides of the cylinder should be roughened.

The laser cylinder 5 is surrounded by a helical flash tube 15 which furnishes the pumping energy to actuate the laser. The tube 15 is connected to a suitable source of electric power 16, marked Power Source, and the usual trigger circuit 17 is looped through the turns of the flash tube and joined to the source of trigger voltage 18, marked Control.

The laser output would be an intense spherical wave with its center at 11, and if this is assumed to be obtained from the right end 10 in FIG. 2, it may be collimated by lens 19.

In addition to the advantage of mode selection which is attained by the use of this invention, the pumping light may, if desired in a particular application, be brought in with very little loss through the low-reflection area of surface 6, as well as through the side walls as previously mentioned.

FIG. 3 shows diagrammatically several wavefronts 20, 21 and 22 spaced between the surface 7 and the surface 6 to indicate by arrows 23 the interreflections of waves which reinforce the laser output shown in FIG. 2.

FIG. 4 illustrates a modification which also embodies this invention, but instead of a solid laser in the form of a cylinder with convex ends, a solid laser 25 has a frusto-conical shape with the larger end having a convex surface 26 silvered at 27 or otherwise reflective, and the smaller end having a concave surface 28, preferably silvered, with a curvature concentric with the convex surface 26.

The center of curvature 30 is at a radial distance $\gamma'$ from the surface 28 and $\gamma''$ from surface 26. This arrangement has the advantage that the rays are not concentrated at a small area reflector, as 11 in FIG. 2, and any tendency to overheat is reduced.

One laser material, artificial ruby, is birefringent. If made in the form of a spherical Fabry-Perot interferometer, as shown in FIG. 2, then in general there would be two wavefronts with origin at 11. One, the ordinary wavefront, would be spherical. The other, the extraordinary wavefront, would be an ellipsoid of revolution. Only the spherical wavefront will be reinforced by interreflections.

This fact makes it possible to produce substantially all of the laser light with one state of polarization. Assuming that the optic axis is vertical, then, as shown in FIG. 3, the ordinary wavefront is polarized horizontally and the laser output will be an intense spherical wave with its center at 11 horizontally polarized.

If it is desired to produce laser action with the extraordinary wave, the surface 7 may be made nonspherical instead of spherical so as to cause this wave to be reflected back to 11. The proper shape would be that of the well known E-wave surface.

If the optic axis is parallel to the axis of the interferometer, the ordinary wave will be tangentially polarized.

The polarized laser output offers additional opportunities for modulation. The Faraday or Kerr effect may be used to change the azimuth of polarization or the state of polarization from plane to elliptical.

While the illustrated embodiments of FIGS. 2 and 4 include a solid state laser, a liquid or gaseous state laser may be employed in containers which would take the shapes illustrated in FIGS. 2 and 4. Reference has been made to the use of a synthetic ruby as the solid state laser and its peculiar property of birefringence described. Other solid state lasers which are not birefringent may be used.

A solid laser body shaped as herein described is for most purposes equivalent to a liquid or gaseous body held to the same shape by a suitable container, and in claiming a laser body the broader construction is to be understood except where the claims are specifically limited to a solid state laser body.

Various modifications of the invention will be apparent to those skilled in this art from the foregoing embodiments, and only such limitations should be imposed as are indicated in the appended claims.

I claim:

1. A frusto-conical laser body forming a resonant cavity having a convex surface at the larger end and a concave surface at the smaller end, said convex and concave surfaces being reflective and having a common center of curvature at a point approximately at the apex of the cone of which the frusto-conical laser body is a part.

2. The structure as defined in claim 1 and wherein said convex reflective surface constitutes substantially the entire larger end area of said body and said concave reflective surface constitutes substantially the entire smaller end area of said body, said body being formed of a transparent material and including a laserable material therein, said concave surface and said convex surface being spherically curved and disposed in predetermined spaced opposed facing relation to each other so as to form said resonant laser cavity therebetween, and at least one of said reflective surfaces being slightly transmissive to optical energy at the emission wavelength of said laserable material.

3. The structure as defined in claim 1 and wherein said convex reflective surface constitutes substantially the entire larger end area of said body and said concave reflective surface constitutes substantially the entire smaller end area of said body, said body being formed of a transparent material and containing a laserable fluid therein, said concave surface and said convex surface being spherically curved and disposed in predetermined spaced opposed facing relation to each other so as to form said resonant laser cavity therebetween, at least one of said reflective surfaces being slightly transmissive to optical energy at the emission wavelength of said laserable fluid.

4. The structure as defined in claim 1 and wherein said convex reflective surface constitutes substantially the entire larger end area of said body and said concave reflective surface constitutes substantially the entire smaller end area of said body, said body being formed of a transparent material and including a solid laserable material therein, said concave surface and said convex surface being spherically curved and having its center of curvature disposed in predetermined spaced opposed facing relation to each other so as to form said resonant laser cavity therebetween, and at least one of said reflective surfaces being slightly transmissive to optical energy at the emission wavelength of said laserable material.

5. The structure as defined in claim 4 and wherein the said solid transparent material including a laserable material therein is in the form of a birefringent crystal capable of effecting a polarized wavefront for the laser light being emitted therefrom.

No references cited.

JEWELL H. PEDERSEN, *Primary Examiner.*

R. L. WIBERT, *Assistant Examiner.*